United States Patent
Guirguis et al.

(10) Patent No.: US 9,909,912 B2
(45) Date of Patent: Mar. 6, 2018

(54) VOLUME MEASURING STATION (71) Applicant: The Boeing Company, Chicago, IL (US)

(72) Inventors: Martin H. Guirguis, Long Beach, CA (US); Don D. Trend, Huntington Beach, CA (US); Jake B. Weinmann, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 14/754,639

(22) Filed: Jun. 29, 2015

(65) Prior Publication Data
US 2016/0378122 A1 Dec. 29, 2016

(51) Int. Cl.
G01F 1/76 (2006.01)
G05D 7/06 (2006.01)
G01F 23/26 (2006.01)

(52) U.S. Cl.
CPC ............. G01F 1/76 (2013.01); G05D 7/0617 (2013.01); G01F 23/263 (2013.01)

(58) Field of Classification Search
CPC ............................... G01F 1/76; G05D 7/0617
See application file for complete search history.

(56) References Cited

U.S. PATENT DOCUMENTS

| | | | | |
|---|---|---|---|---|
| 3,609,379 A | * | 9/1971 | Hildebrandt | A61M 5/1689 128/DIG. 13 |
| 3,627,021 A | * | 12/1971 | Schultz | B22D 11/201 164/254 |
| 5,135,485 A | * | 8/1992 | Cohen | A61M 5/1684 324/606 |
| 6,488,237 B1 | * | 12/2002 | Glasser | B64G 1/14 244/171.1 |
| 6,562,012 B1 | * | 5/2003 | Brown | A61M 5/1689 128/DIG. 13 |
| 8,277,118 B2 | * | 10/2012 | Anderson | G01N 33/2805 374/43 |
| 9,016,530 B2 | | 4/2015 | Topf et al. | |
| 2012/0014405 A1 | * | 1/2012 | Anderson | G01N 33/2805 374/43 |
| 2014/0202180 A1 | * | 7/2014 | Beuligman | F25C 1/225 62/66 |

(Continued)

FOREIGN PATENT DOCUMENTS

| | | | | | |
|---|---|---|---|---|---|
| DE | 3467035 D1 | * | 12/1987 | ............. | G01F 1/002 |
| EP | 0134990 A1 | * | 3/1985 | ............. | G01F 1/002 |

(Continued)

Primary Examiner — Harshad R Patel
Assistant Examiner — Punam Roy
(74) Attorney, Agent, or Firm — Haynes and Boone, LLP (57) ABSTRACT Systems and methods according to one or more examples are provided for determining a flow rate of a fluid. In certain examples, a fluid volume flow rate measurement station may be provided. The station may include a plunger, a volume chamber with a cavity, and a level sensor attached to the volume chamber. In certain such examples, the station may measure the flow rate of a fluid. The station may be incorporated into an automated manufacturing system and certain parameters associated with the automated manufacturing system may be adjusted according to the flow rate of the fluid determined by the station.

20 Claims, 8 Drawing Sheets (56) References Cited

U.S. PATENT DOCUMENTS

2015/0028051 A1\* 1/2015 Topf ................... B05C 11/1013
                                                          222/1
2015/0044376 A1\* 2/2015 Topf ......................... B05C 9/12
                                                          427/355
2015/0053787 A1    2/2015 Tomuta et al.

FOREIGN PATENT DOCUMENTS

EP         0582752 A1 *  2/1994  ........... G03F 7/3071
GB         1422893 A  *  1/1976  .......... A61M 1/3627
WO    WO 2011078612 A3 * 12/2011  ............... D06F 1/00

\* cited by examiner

VOLUME MEASURING STATION

TECHNICAL FIELD

The present disclosure relates generally to production systems and, more particularly, to measuring volumetric flow rates for applying fluids.

BACKGROUND

Some manufacturing processes may utilize fluids (e.g., sealants, adhesives, materials such as foams, and other fluids). Such manufacturing processes may require the fluids to cover a certain area or volume. In some existing manufacturing processes, the mass flow rate of such fluids may be measured while the fluid is applied to determine if the requisite area or volume has been covered. However, certain fluids are non-Newtonian and thus may be compressible and may have densities and/or viscosities that vary when subjected to shear forces. Accordingly, determining the area or volume of fluid dispensed via measuring the mass flow may be inaccurate.

For example, in some conventional techniques, a fluid may be weighed, and the amount of fluid matching a target weight may be dispensed. In other conventional techniques, a flow meter may be implemented with a fluid application device, where the flow meter determines the amount of fluid extruded and pre-determined data correlates the flow detected with a volume.

Moreover, existing volumetric flow rate measurement devices include flow meters that may be clogged and rendered inoperable by higher viscosity fluids. Additionally, such devices may not be adapted for smaller volumes (e.g., such as measuring volumes of fluids with masses of 1 oz. or less) and instead may be adapted for high volumes of fluids, such as the volumes seen in oil pipes. As such, current techniques for measuring the flow of viscous, non-Newtonian fluid involve measuring the mass flow of the fluid through the use of scales.

SUMMARY

Systems and methods are disclosed herein providing an approach for determining a flow rate of a viscous non-Newtonian fluid. In one example, an apparatus including a volume chamber, a level sensor, and a controller may be provided. The volume chamber may be configured to receive a compressible fluid through a nozzle. The level sensor may be configured to detect when the volume chamber has received at least a predetermined level of the fluid and transmit level sensor data, wherein the predetermined level corresponds to a predetermined volume of the fluid. The controller may be configured to receive the level sensor data and determine an elapsed fluid delivery time in response to the level sensor data and determine a flow rate of the fluid based, at least in part, on the elapsed time and the predetermined volume, wherein the flow rate of the fluid is associated with a viscosity of the fluid.

In another aspect, a method may be provided. The method includes commencing filling a volume chamber with a fluid; detecting, by a level sensor, that the volume chamber has received at least a predetermined level of the fluid; transmitting, by the level sensor, level sensor data in response to the detecting; receiving, at a controller, the level sensor data; determining, by the controller, an elapsed fluid delivery time in response to the level sensor data; and determining, by the controller, a flow rate of the fluid based, at least in part, on the elapsed time and the predetermined volume, wherein the flow rate is associated with the viscosity.

The scope of the invention is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the present disclosure and their advantages are best understood by referring to the detailed description that follows. It should be appreciated that like reference numerals are used to identify like elements illustrated in one or more of the figures.

DETAILED DESCRIPTION

In certain aspects, fluids such as sealants, adhesives, foams, and other fluids may be used for manufacturing purposes. Some such manufacturing processes may require the fluids to cover a certain area or volume. For example, a manufacturing process may dispense a set volume of sealant to seal a portion of a fuel tank. The fluids used may be non-Newtonian, compressible, and highly viscous. That is, the viscosity and/or density of the fluids may change depending on shear rate and forces applied to the fluid. As such, the viscosity and/or density of the fluid may vary from batch to batch and may affect the flow rate of the fluid when the fluid is delivered to the work assembly (e.g., the fuel tank from the previous example). Additionally, the density of the fluids may also vary depending on temperature and in certain examples, the fluids may include macro-air bubbles within the fluid that may further vary the viscosity and/or density of the fluids from batch to batch. Certain fluids, such as polysulfide based sealants (e.g., BMS 5-45 sealant used to seal aircraft fuel tanks) may exhibit some or all of the characteristics described herein.

In automated processes, accurate and consistent delivery of fluid to a pre-determined area and/or volume may lead to consistent quality in the manufactured items. Variations in the amount of area covered by the fluid or in the volume of fluid delivered may lead to quality defects. In such cases, having a process to ensure consistency in the area and/or volume covered by the fluid used in the manufacturing process may be desirable. It has been realized that certain conventional processes that rely on measuring the mass flow of fluids may not provide consistent results in determining the area and/or volume covered by a non-Newtonian fluid. Such techniques do not take into account fluid compressibility and the resulting change in volume from compressing the fluid. If the fluid compresses (e.g., within the fluid application device and/or is compressed differently from batch to batch), then the actual amount of fluid applied may be incorrect. The systems, apparatus, and process described herein may provide more consistent coverage of areas and/or volumes by fluids dispensed during manufacturing. The present disclosure realizes that measuring the volumetric flow rates of the viscous, non-Newtonian fluid may be desirable to more accurately and repeatably apply the fluid. Accordingly, a volumetric flow rate measurement device that may measure small volumes and low flow rates of non-Newtonian high viscosity fluids is needed.

Figure 1A:
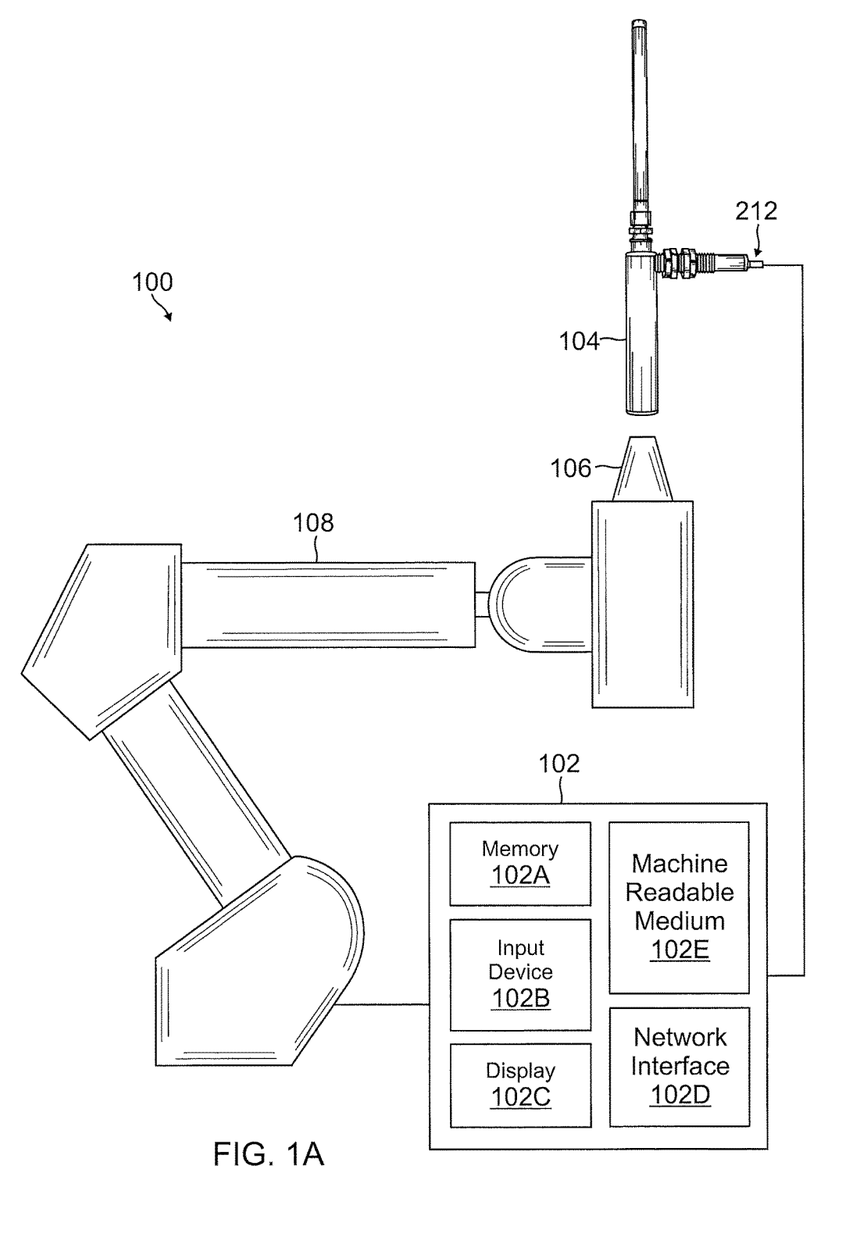
FIG. 1A illustrates an example of an automated manufacturing system in one stage of a manufacturing process in accordance with the disclosure.

One such system is described in FIG. 1A. FIG. 1A illustrates an example of an automated manufacturing system in one stage of a manufacturing process in accordance with the disclosure. The automated manufacturing system 100 of FIG. 1A includes a controller 102, a fluid volume flow rate measurement station 104, a fluid dispensing applicator 106, and a robot arm 108.

The controller 102 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 102 and/or its associated operations may be implemented as a single device or multiple devices (e.g., communicatively linked through wired or wireless connections) to collectively constitute controller 102.

The controller 102 may include one or more memory components or devices to store data and information. The memory 102A may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 102 may be adapted to execute instructions stored within the memory to perform various methods and processes described herein. Certain other examples may also store volatile and non-volatile memory on machine readable medium 102E.

The controller 102 may also include, in certain examples, an input device 102B (e.g., buttons, knobs, sliders, touch screens, touch pads or other input devices) adapted to interface with a user and receive user input. In various examples, the input device 102B may receive user operating instructions such as movement rates and movement paths for the robot arm 108, pressures to run the dispensing applicator 106 at, and tip choices for any nozzles.

In certain examples, the controller 102 may include a graphical user interface (GUI), which may be integrated as part of a display 102C such as a touch screen. In certain such examples, the input device 102E and the GUI may be contained within one device. Additionally, the input device 102B and/or the GUI, as well as other parts of the controller, may be separate devices and may, for example, be parts of a smart phone, a tablet, a personal digital assistant (e.g., a wireless, mobile device), a laptop computer, a desktop computer, or other type of device. Additionally, the memory 102A and processing component of the controller 102 may be integrated into one device or may be distributed over multiple devices. If the controller 102 is distributed over multiple devices a network interface 102D may connect the multiple devices to allow the controller and other devices to communicatively communicate amongst each other. The network interface 102D may include wired (e.g., through electrical wireless or wired data connections) or wireless (e.g., such as Bluetooth, WiFi, NFC, etc.) connections. The wired and/or wireless connections may also be used by the controller 102 to communicate with any other component of the automated manufacturing system 100 as well as any other devices.

The controller 102 may, for example, be connected to the robot arm 108. The automated manufacturing system 100 may be a part of a manufacturing tool or tooling system and the robot arm 108 may, for example, move the fluid dispensing applicator 106 or any other tool (e.g., end effectors, welders, rivet tools, forming tools, etc.) attached to the robot arm 108. The robot arm 108 may move the fluid dispensing applicator 106 to a manufacturing fixture to, for example, dispense a fluid, or may move the fluid dispensing applicator 106 to the fluid volume flow rate measurement station 104 to perform a volumetric flow rate measurement process for a fluid cartridge. In certain examples, the fluid dispensing applicator 106 may also be known as a fluid delivery device.

In FIG. 1A, the robot arm 108 has not yet moved the fluid dispensing applicator 106 to the fluid volume flow rate measurement station 104. The robot arm 108 may instead be transitioning from positioning the fluid dispensing applicator 106 in a manufacturing fixture to inserting a nozzle of the fluid dispensing applicator 106 into the fluid volume flow rate measurement station 104 to perform a volumetric flow rate measurement process for a fluid reservoir. Non-limiting examples of such fluid reservoirs include fluid cartridges, refillable containers, and containers coupled to refilling devices. The fluid volume flow rate measurement station 104 may include a level sensor 212. As shown, the level sensor 212 may be communicatively coupled to the controller 102. The level sensor 212 may output data indicating that a fluid level/volume within the fluid volume flow rate measurement station 104 may have exceeded a fluid level/volume threshold to the controller 102. The fluid level/volume threshold may correspond to a set volume and may be determined, automatically or manually by an operator of the automated manufacturing system, to allow a calculation of a volumetric flow rate of the fluid (e.g., by dividing the set volume by the time required to fill the set volume with the fluid).

Figure 1B:
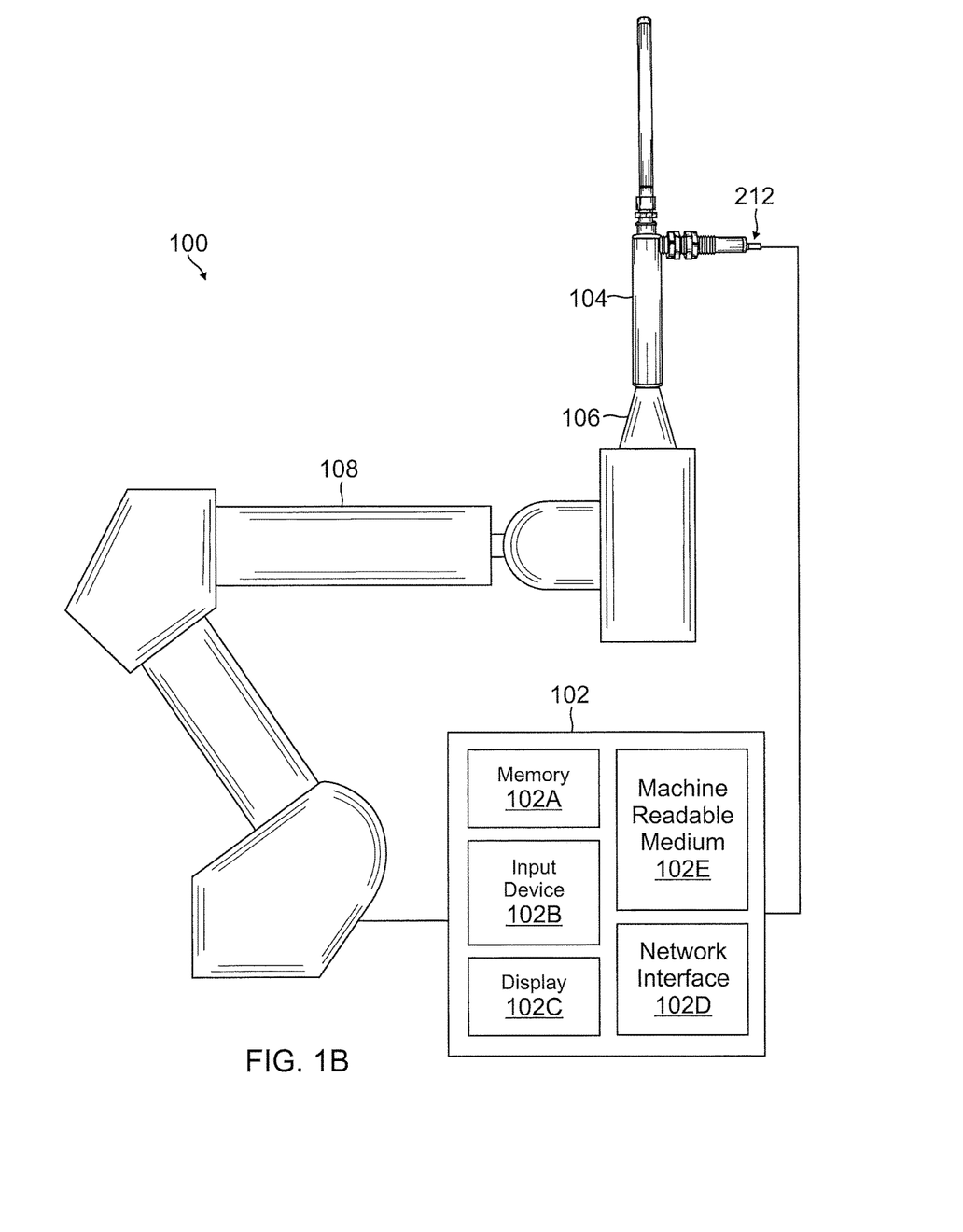
FIG. 1B illustrates the automated manufacturing system of FIG. 1A in another stage of the manufacturing process in accordance with the disclosure.

FIG. 1B illustrates the automated manufacturing system of FIG. 1A in another stage of the manufacturing process in accordance with the disclosure. In FIG. 1B, the robot arm 108 has inserted the nozzle of the fluid dispensing applicator 106 into the fluid volume flow rate measurement station 104 to perform the volumetric flow rate measurement process.

Figure 2:
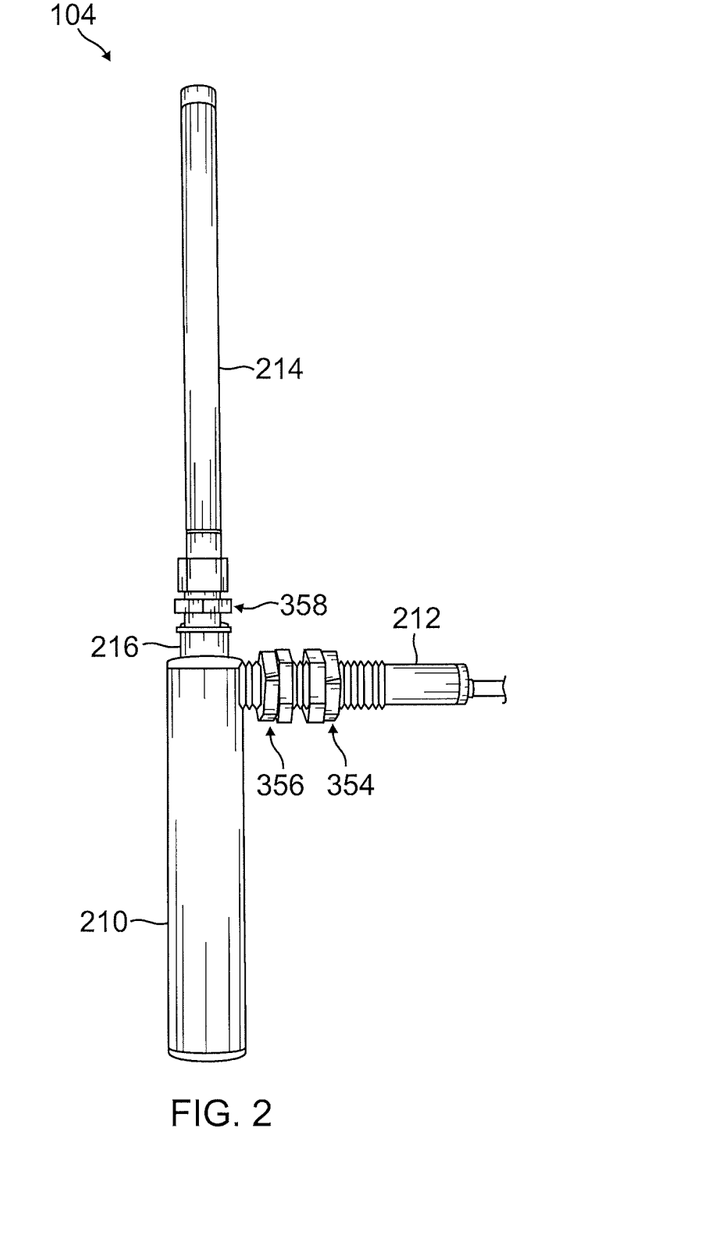
FIG. 2 illustrates a fluid volume flow rate measurement station in accordance with the disclosure.
Figure 3:
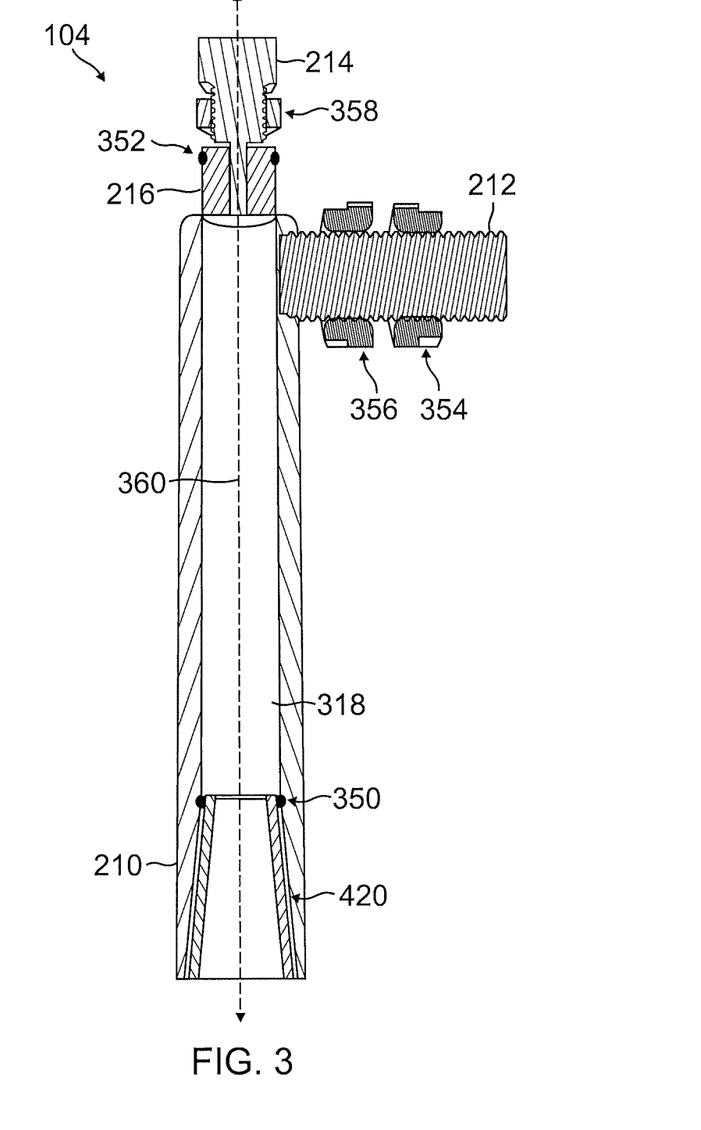
FIG. 3 illustrates a cross sectional view of the fluid volume flow rate measurement station of FIG. 2 in accordance with the disclosure.

The fluid volume flow rate measurement station 104 is described in further detail in FIGS. 2 and 3. FIG. 2 illustrates a fluid volume flow rate measurement station in accordance with the disclosure. The fluid volume flow rate measurement station 104 in FIG. 2 includes a volume chamber 210, a level sensor 212, an actuation device 214, a plunger 216, and fasteners 354, 356, and 358.

The volume chamber 210 may be adapted to receive a volume of fluid to perform a volumetric flow rate measurement process. The volume chamber 210 may include a cavity and an exterior housing. The cavity of the volume chamber 210 may be a cavity with a known volume to allow for calculation of a volumetric flow rate of the fluid. The volume chamber 210, and the cavity of the volume chamber 210, may be cylindrical or substantially cylindrical (e.g., with a circular, oval, elliptical, rectangular, pentagonal, hexagonal, octagonal, or other cross-section), but may also be other geometries. The exterior housing and the cavity of the volume chamber 210 may have cross-sections of similar geometry, or may have cross-sections of differing geometries. In FIG. 2, the volume chamber 210 may be a right angle cylinder, but may also be, in other examples, cylinders with other angles as well as other container shapes (e.g., spherical, rectangular boxes, or other shapes). In certain examples, the volume chamber may be shaped to match various tooling components and/or the nozzle of the fluid volume flow rate measurement system. In certain examples, the volume chamber 210 may be a chamber with a volume of approximately 15 mL or less. In this regard, many existing flow meters are configured for much larger fluid volumes and are ill-suited for small volumes of compressible non-Newtonian fluids. Moreover, measuring the flow rate with a sample volume of approximately 15 mL or less allows the flow rate of such fluids to be determined without consuming large amounts of fluid from an overall fluid batch. This is especially advantageous for small fluid batches where viscosity and/or flow rate may vary from batch to batch. In such cases, using a large amount of fluid the batch to determine a flow rate (e.g., using larger existing flow meters) would leave less of the batch left over for the production process and would therefore require more frequent flow rate measurements, thus reducing production throughput. Other examples may have the volume chamber 210 be a chamber of other volumes.

In certain examples, the level sensor 212 may be connected to the controller and may output level sensor data. In certain examples with high viscosity fluids, the viscosity of the fluid being measured may render certain sensors inappropriate. One example of a sensor appropriate for high viscosity fluids is a capacitive sensor. The capacitive sensors may detect a conduction of dielectric coupling of an element. For example, level sensor 212 may be a capacitive level sensor that may detect a level of a viscous fluid and output data to the controller indicating the level. In such an example, the capacitive sensor may detect, when the volume of the fluid within the volume chamber 210 has not reached a threshold or predetermined level, the conduction of air, but when the volume of the fluid has reached the predetermined level, the fluid may be in contact with or close to the capacitive sensor and the capacitive sensor may detect the conduction of the fluid. The value of the conduction of the fluid may be different from the value of the conduction of the air. Accordingly, the capacitive sensor or the controller may then determine that the volume of the fluid has reached or exceeded the predetermined level. Generally, if the volume of the fluid exceeds the predetermined level, the response of the level sensor may be such that the amount of fluid exceeding the predetermined level may be an amount that is negligible to the process described herein.

In some examples, the level sensor 212 may detect whether the level of fluid has met or exceeded the threshold or predetermined level. Accordingly, the level sensor 212 may be placed at a set depth on the volume chamber 210. Once the fluid has reached the set depth, the volume of fluid within the volume chamber 210 may be determined to be at the threshold or predetermined volume and so the level sensor 212 may be triggered. The level sensor 212 may then send data to the controller indicating that the level of fluid has met or exceeded the threshold or predetermined level. The level sensor 212 may be mounted by the fasteners 354 and 356. The fasteners 354 and 356 may position and/or secure the level sensor 212 through clamping force. The fasteners 354 and 356 may be implemented by various types of fasteners such as bolts, nuts, clamps, rivets, adhesives, and/or others as appropriate.

The plunger 216 may be located at a second end in FIG. 2 and may be adapted to eject fluid from the volume chamber 210 after performing the volumetric flow rate measurement process. In certain examples, the plunger 216 may be shaped similar to the cross section of the volume chamber 210. The plunger 216 may be adapted to push any fluid in the volume chamber 210 out of the volume chamber 210 when the plunger 216 pushes down on the fluid. The plunger 216 may push the fluid out of the volume chamber 210 through a designated exit such as the bottom of the volume chamber 210 (where the nozzle would interface with the volume chamber 210). In certain examples, the plunger 216 may include seals and other features to ensure that a larger portion of the fluid is pushed out of the volume chamber 210.

Movement of the plunger 216 may be controlled by the actuation device 214. The actuation device 214 may be an air cylinder, an electric motor, a cam mechanism, an electromechanical device, a piston, a pushrod, or another type of device that may control movement of a plunger. The actuation device 214 may also be connected to the controller and may, when the controller detects that the nozzle is disconnected from the volume chamber 210, provide instructions for the actuation device 214 to move the plunger 216 along an axis 360 (shown in FIG. 3) from the second end of the volume chamber 210 to the first end of the volume chamber 210 to push fluid out of the volume chamber 210. The fastener 358 may position and/or secure the plunger 216. The fastener 358 may be implemented by various types of fasteners such as bolts, nuts, clamps, rivets, adhesives, and/or others as appropriate.

The fluid automation volume flow rate measurement station may be further illustrated when internal parts are shown. FIG. 3 illustrates a cross sectional view of the fluid volume flow rate measurement station of FIG. 2 in accordance with the disclosure.

In FIG. 3, the volume chamber 210 includes a cavity 318. The cavity 318 may be a set volume. The level sensor 212 may be placed at a set depth on the volume chamber 210 and may detect when fluid within the cavity is at a certain level. In certain examples, the level sensor 212 may be triggered by, for example, the fluid contacting the level sensor 212 or a portion of the level sensor 212 or by the fluid changing a characteristic (such as air pressure) within the cavity 318. The fluid may change the electrical resistance within the cavity 318 and the level sensor 212 may detect the change in resistance. By knowing the depth of where the level sensor 212 is placed on the volume chamber 210, as well as the cross-sectional area of the cavity 318, the volume of the fluid contained by the cavity 318 when the level sensor 212 detects the fluid may be calculated. Such calculations may be performed automatically (e.g., by the controller) or manually (e.g., by an operator). In certain additional examples, placing the level sensor 212 at different levels of depth on the volume chamber 210 may allow the volume of fluid that the cavity 318 may contain before the level sensor 212 is triggered to be varied. Such examples may vary the position of the level sensor 212 automatically or manually as well.

A first end of the volume chamber 210 (shown as the end of the volume chamber 210 closer to the bottom of FIG. 2) may include features that would receive a nozzle, including nozzle 420 shown in FIG. 3. The features may include mechanisms (such as trap doors and other opening mechanisms), lead-ins, gaskets, and other features to help receive the nozzle as well as receive fluid dispensed by the nozzle. Additionally, features on the nozzle may replace or complement features on the volume chamber 210 for receiving the nozzle. Such features may include a gasket 350 on the nozzle 420. In certain examples, the gasket 350 may be an O-ring or other type of gasket.

A second end of the volume chamber 210 may include the plunger 216. In certain examples, the actuation device 214 may move the plunger 216 from the second end to another portion of the volume chamber 210, such as the first end, along the axis 360 to clean or eject fluid from within the cavity 318. Certain such examples may include algorithms contained within the memory of the controller to determine when to clean or eject fluid from the cavity 318. The algorithms may, for example, determine that the volumetric flow rate measurement process has been performed and the nozzle has disconnected from the volume chamber 210 and may, accordingly, then move the plunger 216 with the actuation device 214 to clean the cavity 318. The second end of the volume chamber 210 and/or the plunger 216 may additionally include features to couple the volume chamber 210 to the plunger 216. For example, gasket 352 may seal the second end of the volume chamber 210 when the plunger 216 is inserted into the volume chamber 210. Sealing the volume chamber 210 may prevent the fluid from bypassing the plunger 216, allowing for more complete evacuation of the volume chamber 210 from within the cavity 318. The gasket 352 may be an O-ring or other type of gasket.

Performance of a volumetric flow rate measurement process is illustrated in FIGS. 4A-D. FIGS. 4A-D illustrate the fluid volume flow rate measurement station of FIGS. 2-3 during a manufacturing process in accordance with the present disclosure. FIGS. 4A-D may include the volume chamber 210 with the cavity 318, the level sensor 212, the actuation device 214, the plunger 216 (located at the second end of the volume chamber 210), and a nozzle 420. Additionally, the gaskets 350 and 352 and the fasteners 354, 356, and 358 are also shown in FIGS. 4A-D.

Figure 4A:
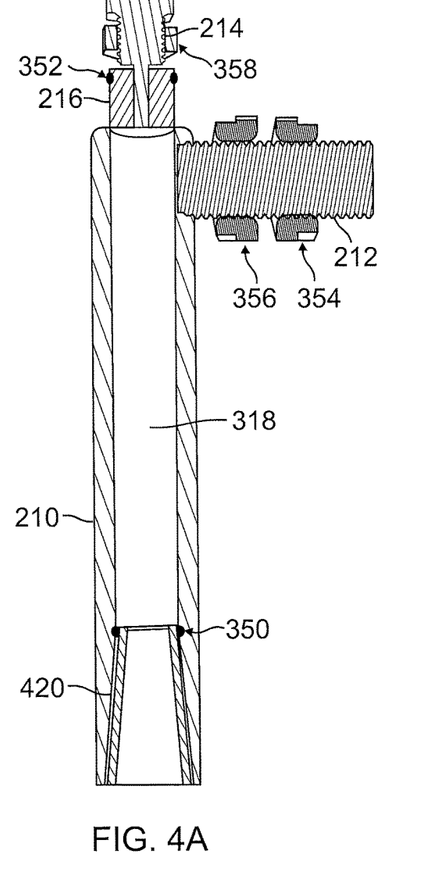
FIGS. 4A-D illustrate the fluid volume flow rate measurement station of FIGS. 2-3 during a manufacturing process in accordance with the present disclosure.

In FIG. 4A, the volume chamber 210 receives the nozzle 420 at an aperture at the first end. The gasket 350 may seal any gaps between the volume chamber 210 and the nozzle 420. In certain examples, the nozzle 420 may be attached to a dispensing applicator of a robot arm. The nozzle may be adapted to dispense liquid that has flowed through the dispensing applicator. In FIG. 4A, while the first end of the volume chamber 210 has received the nozzle 420, fluid may not yet have flowed through the nozzle 420.

Figure 4B:
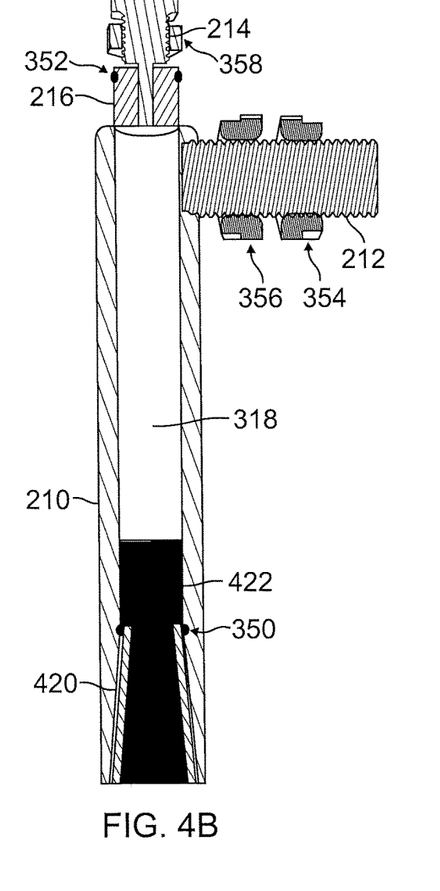

In FIG. 4B, the fluid 422 may have started to flow into the cavity 318 of the volume chamber 210 via the nozzle 420. In certain examples, the controller may commence incrementing an elapsed time when fluid starts being provided to the cavity 318 of the volume chamber 210. In certain such examples, the controller may determine that the fluid has started to enter the cavity 318 when the fluid starts flowing through the nozzle 420 while in other examples, the controller may determine that the fluid has started to enter the cavity 318 through an additional level sensor placed where fluid may first enter the cavity (e.g., the first end of the volume chamber 210).

In FIG. 4B, the level of the fluid 422 may not yet have reached the threshold or predetermined level. Accordingly, in FIG. 4B, the level sensor 212 may not have detected the fluid 422 or that the fluid level has reached the threshold or predetermined level. As such, the fluid 422 may continue to flow from the nozzle 420.

Figure 4C:
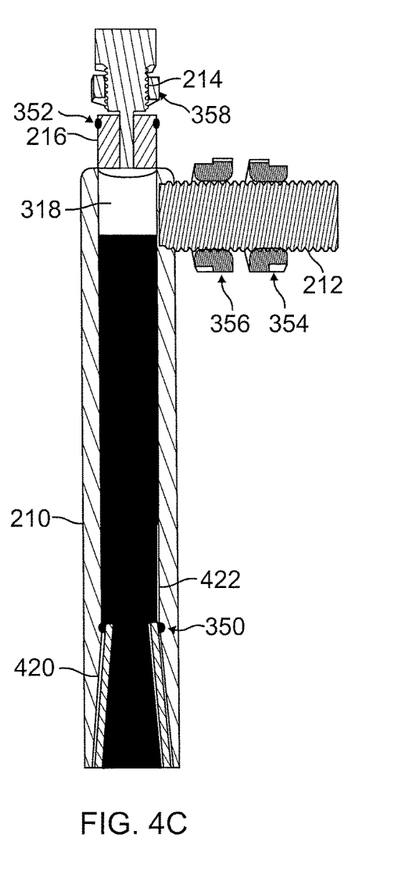

In FIG. 4C, the fluid level may have reached or exceeded the threshold level. The threshold level may be, for example, a level corresponding to a known volume to allow calculation of a volumetric flow rate. The threshold level may be previously determined to correspond to the volume and the positioning of the level sensor 212 may be set so as to determine when the fluid level has reached or exceeded the threshold level. If the fluid level exceeds the threshold level, the amount of fluid exceeding the threshold level may be a negligible amount. Accordingly, the level sensor 212 may have detected that the fluid level has reached or exceeded the threshold level and sent data to the controller indicating as such. In certain examples, the controller may then provide instructions to cease flowing the fluid 422 into the cavity 318 and/or cease incrementing the elapsed time or determine the time required for the liquid to fill a pre-determined volume.

Figure 4D:
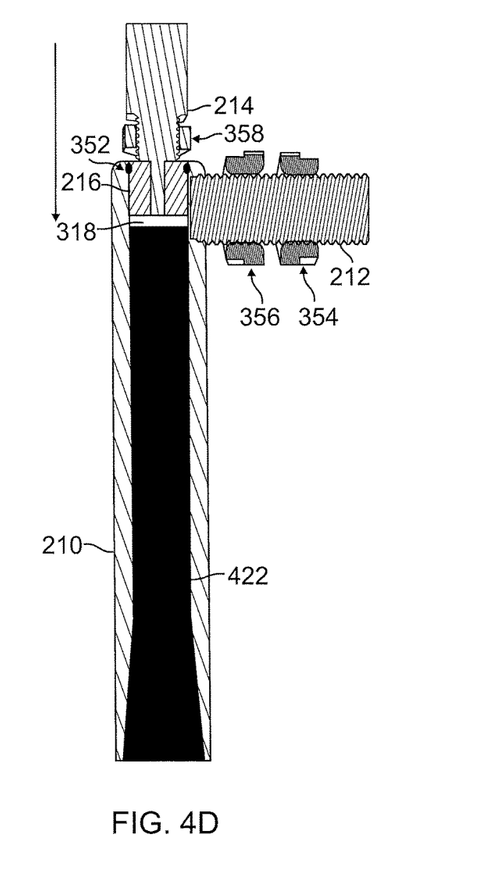

In FIG. 4D, after instructions have been provided to cease flowing the fluid 422 into the cavity 318, the nozzle 420 may have disengaged from the volume chamber 210. After the nozzle 420 has disengaged from the volume chamber 210, the controller may provide instructions to clean or eject the fluid from the cavity 318 of the volume chamber 210. In certain examples, the liquid may be cleaned or ejected from the cavity 318 by having the actuation device 214 move the plunger 216 from the second end of the volume chamber 210 towards the first end of the volume chamber. The actuation device 214 may continue moving the plunger 216 until some or all of the fluid has been cleaned or ejected from the cavity 318. Afterwards, the actuation device 214 may then move the plunger 216 back to the second end of the volume chamber 210 (i.e., the position of the plunger 216 in FIGS. 4A-C).

Figure 5:
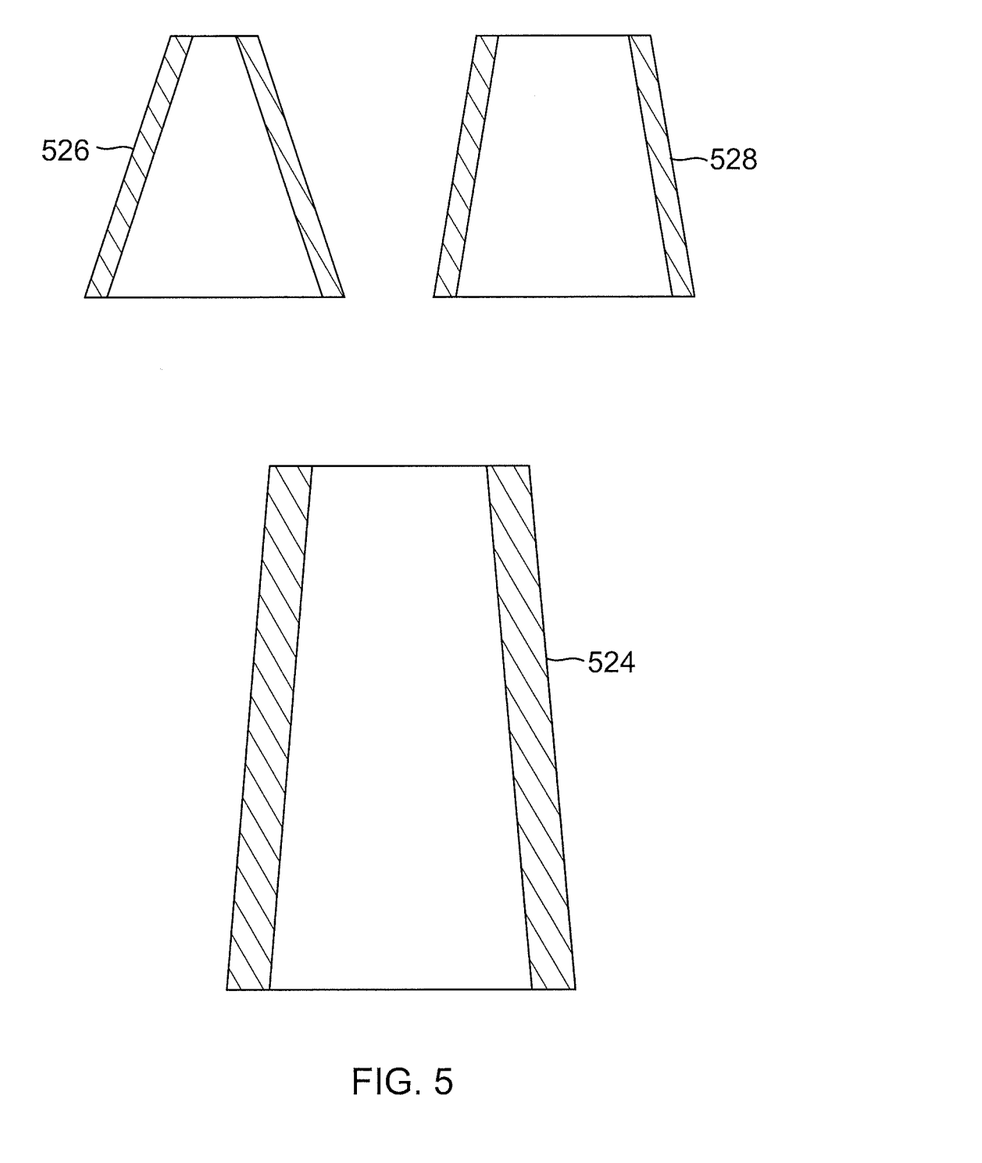
FIG. 5 illustrates a nozzle and a plurality of tips in accordance with the disclosure.

The nozzle described in FIGS. 4A-D may include tips to vary the fluid's delivery flow rate. FIG. 5 illustrates a nozzle and a plurality of tips in accordance with the disclosure. FIG. 5 includes a nozzle 524 and tips 526 and 528. The tip 526 may have a smaller orifice or tip aperture for the flow of fluid, as compared to the orifice/tip aperture of the tip 528. Accordingly, the flow rate of fluid through the tip 526 may be less than the flow rate of fluid through the tip 528. In certain examples, the tip apertures of the tips may also include various different geometries to adjust the geometry (i.e., shape) of the bead of fluid dispensed by the applicator for various surfaces (e.g., having different shapes and sizes). In certain examples, the automated manufacturing system may be used to adhere or seal a plurality of different assemblies. The automated manufacturing system may seal two plates mated at right angles in one process and seal two plates mated horizontally in another process. The two processes may be optimally sealed with beads of different geometries. In such examples, the tip of the nozzle may be changed between the different processes to allow the nozzle to deliver a bead of fluid of the appropriate shape.

The nozzle 524 may be adapted to receive either tips 526 and 528. For example, the nozzle 524 may be threaded and the tips 526 and 528 may have corresponding threads (i.e., corresponding male and female threads). Other examples may have the nozzle 524 be adapted to receive nozzles through other means, such as friction fittings, fasteners, etc. In certain examples, nozzles may have different shapes to vary geometries of beads of applied fluids. For example, the tip 526 may be a tip with a substantially circular opening while the tip 528 may be a tip with an oval opening. Accordingly, if a circular bead is desired, the tip 526 may be selected and if an oval bead is desired, the tip 528 may be selected. In certain other examples, the tip may be used to vary the flow rate of the fluid delivered by the nozzle 524.

In such examples a faster or slower flow rate may be desired. In situations where a slower flow rate is desired, the nozzle 524 may be fitted with the tip 526. In other examples, such as when a fluid is determined to be more viscous, a faster flow rate may be desired. In such situations, the nozzle 524 may be fitted with the tip 528.

Figure 6:
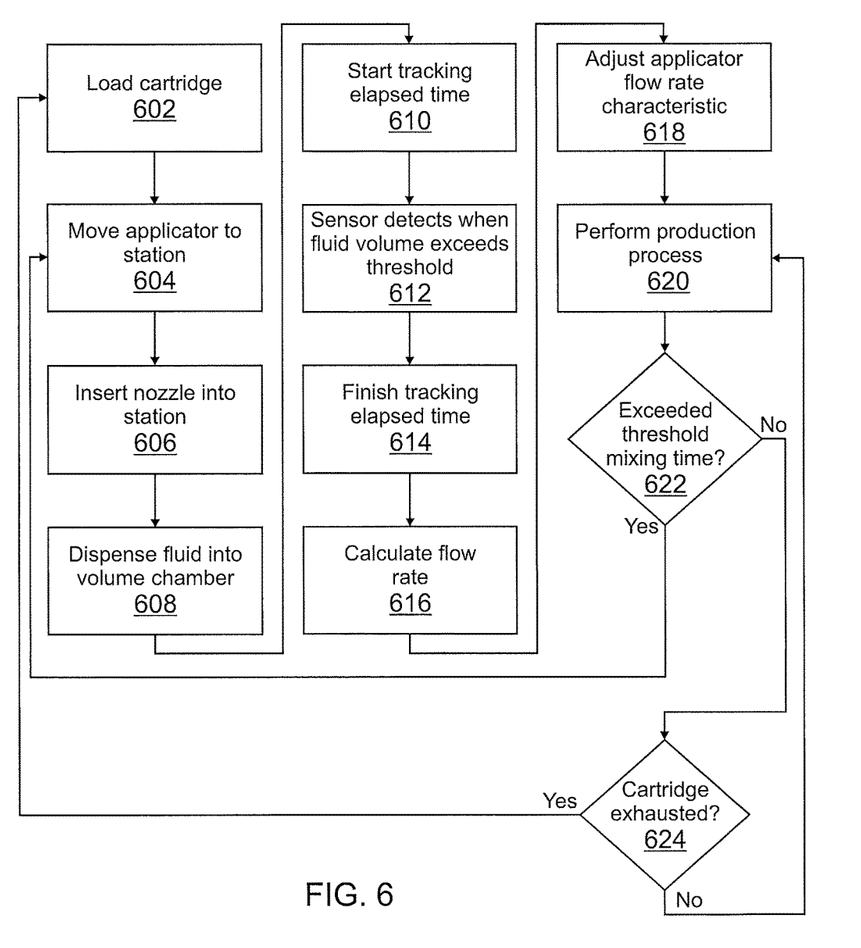
FIG. 6 illustrates a flowchart detailing an example of a manufacturing process using a fluid volume flow rate measurement station in accordance with the disclosure.

The processes, apparatuses, techniques, and systems previously described may be a part of or utilized within a manufacturing process. FIG. 6 illustrates a flowchart detailing an example of a manufacturing process using a fluid volume flow rate measurement station in accordance with the disclosure.

In block 602, a cartridge of fluid may be loaded into an automated manufacturing system. For reference purposes, the cartridge of fluid may be referred to as a first fluid batch. The fluid may be used within the manufacturing process. For example, the fluid may be an adhesive, a sealant, a coating, or another type of fluid used in manufacturing processes. In certain examples, the fluid may be a multi-part fluid. That is, the fluid may be a mixture of multiple parts including, for example, a base and a reactant. In such examples, the multiple parts of the fluid may be mixed in block 602. Additionally, the fluid may be a viscous fluid. In certain examples, the fluid may have a viscosity of between approximately 7,500 to approximately 12,500 Poise. In certain other examples, the fluid may have a viscosity of between approximately 9,000 to approximately 16,000 Poise. The fluid may have a variable viscosity. That is, the viscosity of the fluid may vary depending on environmental factors, such as temperature, pressure imparted to the fluid, or time since a multi-part fluid was mixed. Thus, in some examples, various fluids having various viscosities in a range from approximately 7,500 to approximately 16,000 Poise may be used. For example, fluids having varying density as previously discussed (e.g., polysulfide based sealants such as BMS 5-45 sealant) may exhibit variable viscosity in any of the aforementioned viscosity ranges. Other fluids with other viscosity ranges may also be used as appropriate.

In block 604, a robot arm 108 may move a fluid dispensing applicator 106 to a fluid volume flow rate measurement station 104. The fluid dispensing applicator 106 may be adapted to deliver the fluid, possibly via a nozzle 420.

In block 606, the robot arm 108 and/or the fluid dispensing applicator 106 may insert the nozzle 420 into the fluid volume flow rate measurement station 104. In certain examples, the nozzle 420 may include a tip that may vary the flow rate of the fluid through the nozzle 420. However, in other examples, the nozzle 420 may not include the tip or may not have the tip fitted when delivering fluid to the fluid volume flow rate measurement station 104. Such examples may first measure a base flow rate of the fluid and may, depending on the measured flow rate, vary the flow rate of the fluid through the nozzle 420 with different sized tips. Block 606 may correspond with FIG. 4A.

In block 608, fluid may start to be dispensed into the cavity 318 of the volume chamber 210. Block 608 may correspond with FIG. 4B. In block 610, the controller 102 may detect that the fluid has started to be dispensed into the cavity 318 of the volume chamber 210 and may, accordingly, start tracking the time that has elapsed since the start of fluid delivery into the cavity 318 of the volume chamber 210. The fluid may continue to flow into the cavity 318 in block 610.

In block 612, the level sensor 212 may detect that the fluid has reached or exceeded the threshold or predetermined level. The level sensor 212 may then output data indicating that the fluid has reached or exceeded the threshold level. In certain examples, the fluid may then be ejected from the volume chamber 210 after the level sensor 212 detects that the threshold level has been reached or exceeded and the nozzle 420 has been removed from the station 104. Block 612 may correspond with FIG. 4C and FIG. 4D. In certain examples, blocks 604 to 612 may be performed with only a portion of a volume of the cartridge. For example, in a certain such example, the cartridge may contain about 10-20 ounces of fluid and blocks 604 to 612 may require only 3-5% of the cartridge volume. In such examples, the remaining volume of the cartridge may then be used for production processes.

In block 614, the controller 102 receives data from the level sensor 212 indicating that the fluid level has reached or exceeded the threshold level. Accordingly, the controller 102 may then cease incrementing the elapsed time since the start of fluid delivery. The controller 102 may thus determine the length of time required for the fluid dispensing applicator 106 to dispense the pre-determined volume of fluid.

In block 616, the flow rate of the fluid may be calculated. Various techniques for calculating the flow rate may be used. In certain examples, the flow rate may be calculated using the volume of the cavity 318 or the volume of fluid within the cavity 318 before the level sensor 212 is triggered, as well as the elapsed time from when the fluid started entering the cavity 318 to when the level sensor 212 detected that the fluid has reached or exceeded the threshold level. In certain such examples, the flow rate may be calculated by, for example, dividing the volume filled by the fluid by the elapsed time to arrive at a volume per unit time (e.g., cc/sec) flow rate. In addition to determining the flow rate, a calculated rate of fluid delivery and/or a fluid delivery volume may also be determined. The calculated rate of fluid delivery may be determined from the flow rate of the fluid. The fluid delivery volume may be a volume of fluid to be delivered to a work assembly during the production process. In certain examples, the fluid delivery volume may vary depending on the production process, the available fluid delivery time, and the flow rate of the fluid.

In block 618, the flow rate characteristics of the fluid dispensing applicator 106 may be adjusted in response to the measured flow rate. For example, in certain examples, some or all of the tips of the nozzle 420, the pressure that the fluid dispensing applicator 106 delivers the fluid at (i.e., the flow pressure), and the rate of movement of the fluid dispensing applicator 106 or the robot arm 108 may be changed.

As an illustrative non-limiting example, a process may require the extrusion of a specific volume of the fluid over a specific distance. In a first application of such an example, the movement speed of the robot arm 108 may be fixed and the fluid volume flow rate measurement station may be used to determine the flow rate of the fluid using various pressures until a desired flow rate is detected at a tested pressure. The fluid dispensing applicator 106 may then apply the fluid at the tested pressure while moving the robot arm 108 at the previously defined speed.

For example, the robot arm 108 may be configured to move at a set rate of 5 cm per second during manufacturing operations. The manufacturing operation may be a sealing operation, and it may be determined that the robot arm 108 needs to deliver 500 cc of sealant over 50 cm, preferably in an even manner. Thus, it may be determined that 10 seconds of movement are required for the robot arm 108 to cover the 50 cm distance and deliver 500 cc of sealant. The desired fluid delivery rate is thus 50 cc per second in such an example.

It may also be determined that with a baseline configuration, the fluid dispensing applicator 106 delivers the fluid at 100 cc per second, meaning over 10 seconds of application, 1,000 cc of sealant would be delivered. Thus, the automated manufacturing system may change the nozzle tip to a more restrictive tip (e.g., a tip designed to reduce fluid flow to 50% of the baseline tip's flow) or change the fluid pressure to reduce the fluid flow rate to 50% of the baseline. Either technique may reduce the flow rate of sealant from the fluid dispensing applicator 106 to 50 cc per second and so allow the fluid dispensing applicator to deliver 500 cc of sealant over the 10 seconds that the robot arm 108 requires to cover the 50 cm distance. In the highlighted example, the automated manufacturing system may then test delivering the fluid at a reduced fluid pressure and determine that the flow rate of the fluid at the reduced fluid pressure is 50 cc per second. The reduced fluid pressure may then be used to carry out the manufacturing process In certain such examples, the tip may also be changed so that the bead of fluid applied by the fluid dispensing applicator 106 has a desired shape. The tip may impact the fluid flow rate and so the amount that the fluid pressure is reduced may take into account the change in fluid flow rate from changing the tip.

In a second application of such an example, the movement speed of the robot arm 108 may be variable. In such an example, the fluid volume flow rate measurement station may be used to determine a flow rate of the fluid. The movement speed of the robot arm 108 may then be adjusted according to the determined flow rate of the fluid. In such an example, using the example of the previous paragraph, the speed of the robot arm 108 may be adjusted according to the flow rate determined. Thus, the movement speed of the robot arm 108 in the previous example may be sped up, to cover the 50 cm in 5 seconds and so deliver 500 cc of sealant at a flow rate of 100 cc per second.

In block 620, the manufacturing or production process is performed with the adjusted fluid dispensing applicator. Using the above example, the fluid dispensing applicator 106 may deliver 500 cc of sealant over 10 seconds across 50 cm.

In block 622, for multi-part fluids, the controller 102 may track the time since the multiple parts of the fluid have been mixed and determine whether the time since mixing has exceeded a mixing time threshold. The mixing time threshold may depend on the composition of the fluid and in certain examples, the mixing time threshold may be, for example, 5 minutes, 10 minutes, 20 minutes, 30 minutes, or an hour. The mixing time threshold may be set such that the fluid properties may measurably change from its initial properties after being mixed for a period exceeding the mixing time threshold. For example the flow rate of the fluid may increase by approximately 10% after 20 minutes from mixing and so 20 minutes may be the mixing time threshold. If the time since mixing is determined to have exceeded the mixing time threshold, the process may return to block 604 to determine the volumetric flow rate of the fluid once again. In certain examples, if the controller determines that the mixing time threshold has been exceeded while in the middle of performing a production process, it may not return to block 604 until the current production process has finished. If the time since mixing is determined to not have exceeded the mixing time threshold, the process may continue to block 624.

In block 624, the controller 102 may determine whether the cartridge has been exhausted (e.g., has run out of fluid) or is otherwise unable to provide fluid due to, for example, being clogged or being defective by, for example, having a cartridge with a defective outlet that may be unable to be broken. If the controller 102 determines that the cartridge is unable to provide fluid, the process may return to block 602 and load a new cartridge. If the controller 102 determines that the cartridge has not been exhausted, the production process may return to block 620 and continue. In certain examples, the controller 102 may include algorithms to determine whether the cartridge will be exhausted during performance of an upcoming production process, such as by determining the remaining volume of fluid and comparing it to the volume of fluid required to perform one full production process. If the controller 102 determines that the cartridge may be exhausted while performing the upcoming production process, the process may return to block 602 and load another fluid cartridge. In other words, a second fluid batch may be loaded.

In view of the above, it will be appreciated that the various techniques discussed herein provide an improved approach for determining and applying a reliable volume of compressible fluid with various viscosity ranges. For example, in contrast to conventional mass-based or flow meter approaches, the techniques of the present disclosure may be used to determine the volumetric flow rate of a fluid while taking into account differing fluid densities that may vary from batch to batch, particularly for fluids having the various viscosities discussed herein.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
   a volume chamber configured to receive a fluid through a nozzle, wherein the fluid is compressible;
   a level sensor configured to detect when the volume chamber has received at least a predetermined level of the fluid and transmit level sensor data, wherein the predetermined level corresponds to a predetermined volume of the fluid; and
   a controller configured to:
      determine that the volume chamber has received the nozzle and the nozzle has commenced filling the volume chamber with the fluid,
      receive the level sensor data,
      determine, from the level sensor data, that the volume of the fluid within the volume chamber is at the predetermined level,
      determine an elapsed fluid delivery time based, at least in part, on a time from when the nozzle commenced filling the volume chamber to when the level sensor data indicates that the volume of the fluid is at the predetermined level, and
      determine a flow rate of the fluid based, at least in part, on the elapsed fluid delivery time and the predetermined volume, wherein the flow rate of the fluid is associated with a viscosity of the fluid.

2. The apparatus of claim 1, further comprising a fluid dispensing applicator configured to deliver the fluid and communicatively connected to the controller.

3. The apparatus of claim 2, wherein the controller is further configured to determine a calculated rate of fluid delivery and cause the fluid dispensing applicator to deliver the fluid according to the calculated rate of fluid delivery, wherein the calculated rate of fluid delivery is based, at least in part, on the flow rate of the fluid.

4. The apparatus of claim 3, wherein the calculated rate of fluid delivery is based, at least in part, on a rate of movement of the fluid dispensing applicator.

5. The apparatus of claim 2, wherein the fluid dispensing applicator includes the nozzle and the nozzle is configured to receive a tip with a tip aperture configured to shape a bead of the fluid.

6. The apparatus of claim 1, further comprising a plunger and an actuation device mechanically connected to the plunger, wherein:
the volume chamber includes a first end with an aperture and a second end configured to receive the plunger;
the actuation device is mechanically connected to the plunger and configured to move the plunger a distance along an axis from the second end to the first end; and
the controller is further configured to cause the plunger to move the distance along the axis.

7. The apparatus of claim 1, wherein:
the fluid is a fluid from a first fluid batch;
the volume chamber is further configured to receive a fluid from a second fluid batch;
the level sensor is further configured to detect when the volume chamber has received at least a predetermined level of the fluid from the second fluid batch; and
the elapsed fluid delivery is a first elapsed fluid delivery time and the controller is further configured to determine a second elapsed fluid delivery time and determine a flow rate of the fluid from the second fluid batch based, at least in part, on the second elapsed fluid delivery time and the predetermined volume, wherein the flow rate of the fluid from the second fluid batch is different from the flow rate of the fluid from the first fluid batch.

8. The apparatus of claim 1, wherein the fluid is a polysulfide based sealant and has a variable viscosity in a range of approximately 7,500 to approximately 16,000 Poise.

9. A method comprising:
determining that a volume chamber configured to receive a compressible fluid has received a nozzle;
commencing filling, with the nozzle, the volume chamber with the compressible fluid;
detecting, by a level sensor, that the volume chamber has received at least a predetermined level of the fluid, wherein the predetermined level corresponds to a predetermined volume of the fluid;
transmitting, by the level sensor, level sensor data in response to the detecting;
receiving, at a controller, the level sensor data;
determining, by the controller, an elapsed fluid delivery time based, at least in part, on a time from when the nozzle commenced filling the volume chamber to when the level sensor data indicates that the volume of the fluid is at the predetermined level; and
determining, by the controller, a flow rate of the fluid based, at least in part, on the elapsed fluid delivery time and the predetermined volume, wherein the flow rate of the fluid is associated with a viscosity.

10. The method of claim 9, wherein the elapsed fluid delivery time comprises a time from the commencing to the detecting.

11. The method of claim 10, further comprising delivering the fluid to a work assembly.

12. The method of claim 11, further comprising determining a fluid delivery time and determining a fluid delivery volume based, at least in part, on the fluid delivery time and the flow rate of the fluid.

13. The method of claim 10, further comprising varying a flow characteristic of a fluid delivery device.

14. The method of claim 13, wherein varying the flow characteristic of the fluid delivery devices includes at least one of:
installing a nozzle tip configured to shape a bead of the fluid on the fluid delivery device; and
varying a flow pressure based on the flow rate of the fluid.

15. The method of claim 9, wherein the fluid is a fluid from a first fluid batch, the elapsed fluid delivery time is a first elapsed fluid delivery time, and the method further comprises:
commencing filling a volume chamber with a compressible fluid from a second fluid batch;
detecting, by a level sensor, that the volume chamber has received at least a predetermined level of the fluid from the second fluid batch, wherein the predetermined level corresponds to a predetermined volume;
determining, by the controller, a second elapsed fluid delivery time; and
determining, by the controller, a flow rate of the fluid from the second fluid batch based, at least in part, on the second elapsed fluid delivery time and the predetermined volume, wherein the flow rate of the fluid from the second fluid batch is different from the flow rate of the fluid from the first fluid batch.

16. The method of claim 9, further comprising mixing at least a base and a reactant to form the fluid and tracking a mixing time since the base and the reactant are mixed.

17. The method of claim 16, further comprising purging the fluid from the volume chamber.

18. The method of claim 17, further comprising determining that the mixing time has exceeded a mixing time threshold and repeating the steps of claim 9 to determine a second flow rate of the fluid.

19. The method of claim 9, wherein the fluid is a polysulfide based sealant with a variable viscosity in a range of approximately 7,500 to approximately 16,000 Poise.

20. A method comprising:
commencing filling a volume chamber with a compressible fluid, wherein the fluid has a variable viscosity in a range of approximately 7,500 to approximately 16,000 Poise;
detecting, by a level sensor, that the volume chamber has received at least a predetermined level of the fluid, wherein the predetermined level corresponds to a predetermined volume of the fluid;
transmitting, by the level sensor, level sensor data in response to the detecting;
receiving, at a controller, the level sensor data;
determining, by the controller, an elapsed fluid delivery time in response to the level sensor data; and
determining, by the controller, a flow rate of the fluid based, at least in part, on the elapsed fluid delivery time and the predetermined volume, wherein the flow rate of the fluid is associated with the viscosity.

* * * * *